United States Patent [19]
Lefferts

[11] 3,745,308
[45] July 10, 1973

[54] TEMPERATURE CONTROL CIRCUITS

[75] Inventor: Peter Lefferts, Hopewell, N.J.

[73] Assignee: Heinemann Electric Company, Trenton, N.J.

[22] Filed: July 1, 1971

[21] Appl. No.: 158,895

[52] U.S. Cl. ............................. 219/499, 219/501
[51] Int. Cl. ............................................ H05b 1/02
[58] Field of Search.................... 219/497, 499, 501, 219/505

[56] References Cited
UNITED STATES PATENTS

| | | | |
|---|---|---|---|
| 2,866,067 | 12/1958 | Dolan et al. | 219/499 |
| 3,215,818 | 11/1965 | Deaton | 219/499 |
| 2,918,558 | 12/1959 | Evans | 219/499 |
| 2,819,371 | 1/1958 | Aldrich et al. | 219/499 X |
| 3,018,356 | 1/1962 | Busch et al. | 219/499 X |

Primary Examiner—Bernard A. Gilheany
Assistant Examiner—F. E. Bell
Attorney—Joseph G. Denny, III et al.

[57] ABSTRACT

A system for applying electrical power to a heater element in response to a manual command, periodically monitoring changes in the temperature of the heater element by sensing its resistance during the heating process, and automatically disconnecting power from the heater when it reaches a preselected temperature. The system includes control circuits comprising an electrical bridge, including the heater element itself as one arm thereof, a comparator circuit for periodically sensing the output of the bridge at a time when the bridge is fully energized. The comparator generates a comparator signal each positive half cycle of the power source dependent upon the temperature of the heater element. A relay controls power to the bridge in response to a control signal generated by a bistable circuit. The bistable circuit is initially switched "on" in response to a manual command which results in power being applied to the bridge. Subsequently, the bistable circuit is switched "off" by each positive half cycle of power applied to the bridge circuit and "on" by the comparator signal at the end of each positive half cycle of power to the bridge circuit, so long as the temperature of the heater is below the preselected value. Each time the bistable circuit is switched "on," a half wave of power is applied to the relay to maintain it in an energized condition. When the temperature of the heater reaches the predetermined value, the comparator signal ceases to switch the bistable circuit "on" and power is disconnected from the bridge and the heater.

20 Claims, 11 Drawing Figures

INVENTOR.
PETER LEFFERTS
BY
Denny and Denny
ATTORNEYS.

Patented July 10, 1973  3,745,308

MANUAL TRIGGER

BRIDGE POWER

LINE 62

R 30

BISTABLE OUTPUT

DETECTOR OUTPUT

POWER TO RELAY 43

DETECTOR INPUT

INVENTOR.
PETER LEFFERTS
BY
Denny and Denny
ATTORNEY.

3,745,308

TEMPERATURE CONTROL CIRCUITS

BACKGROUND OF THE INVENTION

The present invention relates generally to control circuits, and more particularily to improved circuits for initiating the application of power to a heater element in response to a manual command, allowing the heater to rise rapidly in temperature while periodically sensing its temperature, and automatically disconnecting power from the heater when its temperature reaches a predetermined value.

The control circuits of the invention are designed specifically for use in conjunction with apparatus for heating sealing packages made of polymeric or heat sealable materials wherein the heater element is a single wire, a plurality of wires, or a metal bar which is brought into contact with opposed sections of the package to complete the enclosure of materials in the package. While the control circuits of the invention have been designed for this specific purpose, the principles of the invention may be applied in various other temperature control circuits.

Therefore, it is an object of this invention to provide control circuits for controlling the apllication of power to a heating element so as to allow the element to rise rapidly to a preselected temperature and to automatically disconnect the source of power from the heating element when it reaches this temperature.

A further object is to provide a system for accomplishing the above noted purposes which has an extremely fast response time and thereby can be recycled repeatedly without a loss in sensitivity.

A further object is to provide a system in which the heater element also acts as a temperature sensing element to reduce the loss in sensitivity normally caused by thermal lag.

Yet another object is to provide an automatic temperature control system of the character above noted that includes a power relay having power switching contacts for selectively controlling power to a heater element, an electronic control circuit for selectively controlling the operation of the power relay, and a detector circuit for sensing the temperature of the heater element by monitoring the output of an electrical bridge having the heater element connected as one arm thereof.

Yet another object is to provide a system of the above noted type having a power relay for controlling power to a heater element, and further including control circuits for applying full wave voltage to the power relay to initially connect power to the load, and half wave voltage to the power relay while the bridge is energized, so as to increase the response time of the system.

A still further object is the provision of a circuit for detecting and eliminating arcs across the power relay contacts of the invention.

DETAILED DESCRIPTION OF THE INVENTION

Figure 1:
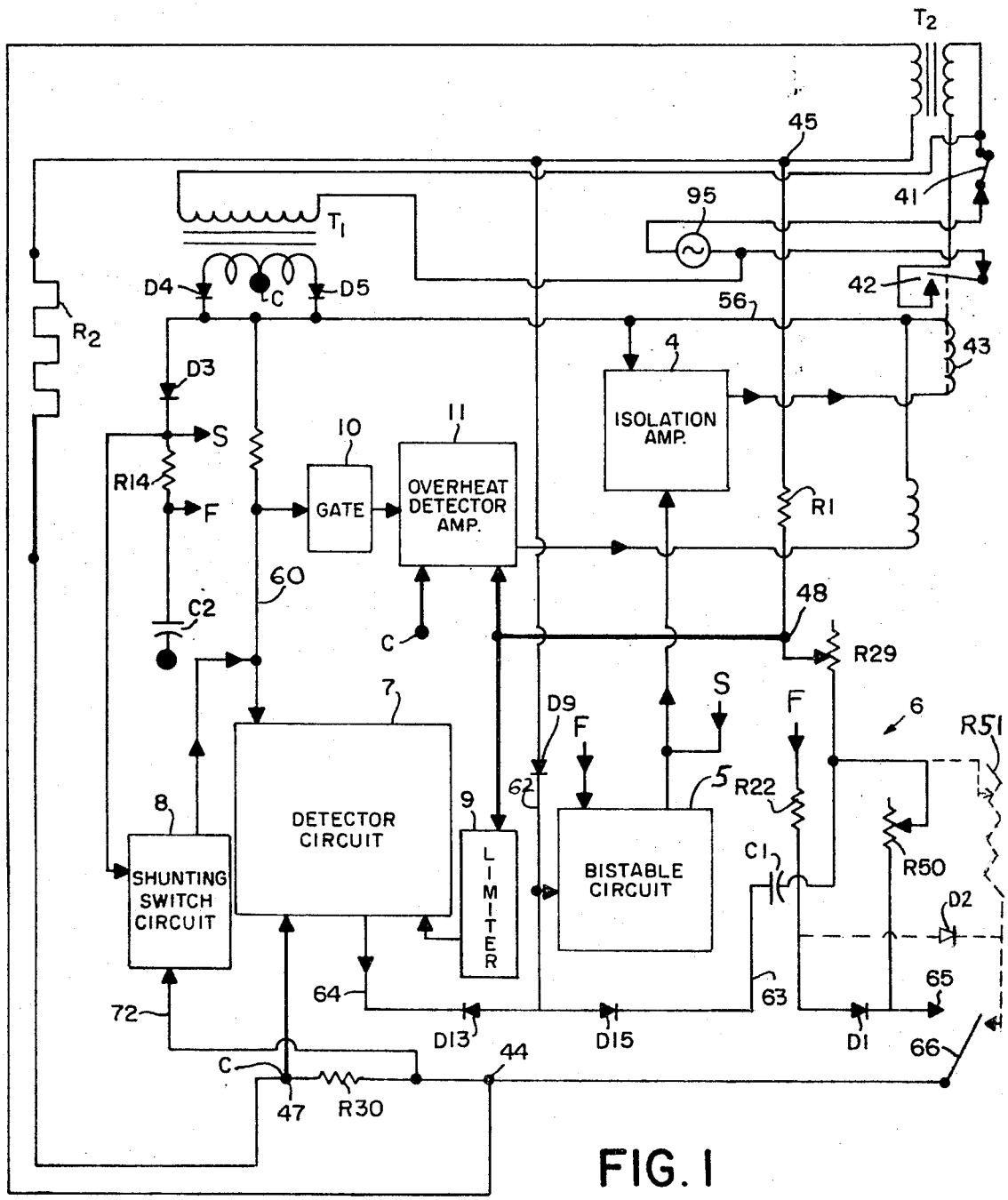
FIG. 1 is an operational diagram of the control circuits of the invention, illustrating the operating principles of the invention.

The general operation of the control circuits of the invention may be understood with reference to the simplified diagram, partially in block form, of FIG. 1. The general purpose of the control circuits of the invention is to raise the temperature of the heater element $R_2$ rapidly to a preselected temperature in response to a manual command from an operator and to automatically disconnect power from the heater upon reaching the preselected temperature so as to halt the rise in temperature of the heater. The heater element $R_2$ may be a bare wire which is brought into contact with a package having sections which are heat sealable to each other. A switch 66 is mechanically operated to the close position when the wire heater $R_2$ is brought into contact with the package to be sealed and returns to the open position, as shown, when the heater $R_2$ is withdrawn from contact with the package. Thus, the operation of the control circuits is initiated by the closing of the switch 66.

The heater element $R_2$ forms one of the conjugate arms of an electrical monitored and is made of a metal having a high temperature coefficient of bridge The remaining arms of the bridge comprising $R_{30}$, $R_1$, and the series combination of $R_{29}$, $R_{50}$ and switch 66, preferably are made of materials having a low temperature coefficient of resistivity. In the preferred embodiment the heating element $R_2$ has been selected to have a large positive temperature reduce this of resistivity and may be selected from materials as nickel, tungsten, etc., or suitable alloys further increase these materials. the detector circuit Power is applied across the nodes 45 and 44 of the bridge from the secondary of the transformer $T_2$. The primary of the transformer $T_2$ is energized from a conventional source 95 via the contacts 41 and 42, The contacts 41 are a part of a suitable circuit breaker and are normally closed. The contacts 42 are operated by the relay coil 43 and are closed only during the heating cycle, as will be explained hereafter.

The output of the bridge is present across the nodes 47 and 48 and is monitorrd periodically by a d.c. detector circuit 7. The ohmic values of the bridg arms are chosen so that at some low temperature of $R_2$, for example, room temperature, the output of the bridge is negative, i.e., the voltage at node 48 is negative with respect to the voltage at the node 47. Under these conditions a rise in temperature of the heater $R_2$ will tend to gradually reducethis negative bridge output until the point is reached at which the bridge is balanced. A furtheinrease in the temeerature of $R_2$ will reverse the polarity of the bridge output which is detected by the detectorcircuit 7 to control the power to the bridge.

The relay 43, which operates the contacts 42 to connect power to the bridge, is powered from a transformer $T_1$ which has its primary connected to the source 95 via the normally closed circuit breaker contacts 41.

Various d.c. voltages to power the control circuits are developed by means of the transformer $T_1$ in conjunction with the rectifying diodes $D_4$, $D_5$ and $D_3$, and the filtering network including resistor $R_{14}$ and capacitor $C_2$. The primary winding of $T_1$ is powered from the a.c. source 95 via the normally closed circuit breaker contacts 41. The secondary of $T_1$ is center tapped to provide a common voltage or system reference voltage at circuit node C. This center tapped connection C is coupled by appropriate lines (not shown in FIG. 1) to various circuits of the system to act as one side of several d.c. voltage supplies. The large dots in FIG. 1 indicate common points in the circuit. A full wave pulsating voltage is supplied on line 56, while semi-filtered and filtered voltages are generated at nodes S and F, respectively, and supplied to various subcircuits of the system, as indicated by letter designations for the common circuit points.

The operation of the control circuits is initiated by turning "on" bistable circuit 5 with a pulse developed on line 63 from the manual trigger generator circuit 6. With the transformer $T_2$ de-energized, contacts 41 closed, contacts 42 open, and switch 63 the position shown in FIG. 1, the capacitor $C_1$, which is part of the manual trigger generator circuit 6, charges from the filtered d.c. voltage supply on line F. The trigger pulse on line 63 for initially switching the bistable circuit to its "on" state is generated by closing switch 66 which completes the bridge circuit by connecting the bridge resistor $R_{50}$ to the bridge node 44. The closing of switch 66 also simultaneously discharges capacitor $C_1$ to generate the trigger pulse on line 63 which is applied to the bistable circuit via diode $D_{15}$. The trigger pulse switches the bistable circuit to its "on" state, the bistable circuit having been set to its "off" state at the previous heating operation or upon initally energizing the circuits.

In its "on" condition the bistable circuit generates a control signal suitable to activate the isolation amplifier which in turn energizes the relay 43 by permitting the full wave pulsating voltage on line 56 to be applied across the relay 43. With the relay 43 pulled in, the contacts 42 are closed and the transformer $T_2$ is energized to power the bridge.

With the bridge energized, an output signal is developed across nodes 47 and 48 which is fed to the detector circuit 7. In addition, the A.C. power on the bridge perfrms two other functions. Each positive half cycle of power on the node 45 of the bridge is fed via diode $D_9$ and line 62 to the bistable circuit to switch it "off". With the bistable circuit turned "off", the isolation amplifier 4 is de-activated and the pulsating d.c. supply on line 56 is disconnected from the relay 43 for at least a half cycle. Since this "off" trigger pulse on line 62 occurs on alternate half cycles of bridge power, the relay 43 is energized at most by half wave power during the time the bridge is powered and heater element $R_2$ is below the preselected temperature. The relay 43 maintains the contacts 42 closed in response to half wave energization since it is selected to have a time constant greater than a half cycle.

In addition, to turning "off" the bistable circuit via line 62 on each positive half cycle of bridge power several volts A.C. appears across the resistor $R_{30}$ when the bridge is energized. The voltage across $R_{30}$ is utilized to activate the detector circuit 7 only during a portion of each positive half cycle of the bridge power when a significant current is flowing through the bridge. This improves the sensitivity of the detector circuit by insuring that an easily measurable output is present at the input to the detector circuit 7 when it is activated. This timing of the activation of the detector circuit 7 is accomplished by employing a shunting switch circuit 8 which holds the detector circuit 7 in a de-activated state until the voltage across $R_{30}$ reaches a specified negative polarity a.c. value at which time the shunting switch circuit 8 is operated to allow pulsating power on line 75 to be applied to the detector circuit 7.

Since the a.c. voltage across the resistor $R_{30}$ is 180° degrees out of phase with the voltage on line 62, the voltage across $R_{30}$ reaches the required negative value to trigger the shunting switch circuit 8 during the same half cycle in which the bistable circuit has been turned "off" by the pulse on line 62.

Once the shunting switch circuit has been triggered by the properly phased signal across resistor $R_{30}$, the detector circuit 7 is energized by connecting the pulsating d.c. voltage on line 75 thereto. Once energized the detector circuit 7 senses the instantaneous output of the bridge and generates a detector signal to either turn "on " the bistable circuit (if the temperature of $R_2$ is below the preselected value) or to allow the bistable circuit to remain in the "off" condition (if the temperature of $R_2$ is above the preselected value).

The detector signal takes the form of a pulse-no pulse waveform, the pulse, if generated, occurring at the end of the positive half cycle of power to the bridge and near the zero cross-over point of the bridge power cycle.

Thus, as long as the temperature of $R_2$ is below the preselected temperature and the bridge is energized, the bistable circuit 5 will be switched twice each full cycle of bridge power. It is switched "off" near the beginning of each positive half cycle of bridge power via line 62 and switched "on" again near the end of this positive half cycle by a pulse from the detector circuit 7. Therefore, so long as $R_2$ is below the desired final temperature the bistable circuit 5 and consequently the isolation amplifier have 50 percent duty cycles and the relay 43 is energized by half wave voltage from line 56.

As mentioned hereinbefore, this half wave energization of the relay 43 is sufficient to hold in the contacts 42 to maintain the bridge in the energized condition. The use of full wave power to initially energize relay coil 43 and pull in the contacts 2 followed by the use of only half wave power to hold the relay 43 in the energized condition while the heater $R_2$ is below the preselected temperature results in an increased speed of response of the control system.

Briefly summarizing the operation of the system with reference to FIG. 1, when switch 66 is closed a manual trigger pulse is generated on line 63 as a result of the discharge of capacitor $C_1$. This turns the bistable circuit 5 and the isolation amplifier 4 "on" and applies full wave power from line 56 to the power relay 43. After a time equal to the inherent mechanical delay associated with the relay 43, the contacts 42 are closed to apply power via transformer $T_2$ to the bridge across the nodes 44 and 45. The first positive half wave of bridge power is fed back to turn "off" the bistable circuit via line 62 and diode $D_9$. At a time during the occurrence of this first positive half cycle the voltage across resistor $R_{30}$ is of the proper polarity and magnitude to unlatch the shunt switch circuit 8 resulting in the activation of detector circuit 7. At the moment of activation, the detector circuit 7 senses the instantaneous d.c. output of the bridge which is fed into it via nodes 47 and 48. As long as the temperature of $R_2$ is below the predetermined temperature a pulse is generated by the detector circuit 7 near the end of the positive half cycle of bridge power to turn the bistable circuit back "on". Since the duty cycle of the bistable circuit after the bridge is energized and $R_2$ is below the preselected temperature is 50 percent, half wave power energizes the relay 43 to maintain the contacts 42 closed. When the temperature of $R_2$ rises above the preselected value the "on" trigger pulses from the detector circuit 7 cease resulting in the turn-off of the bistable circuit 5 and the de-energization of the relay 43. Contacts 42 are opened and power is disconnected from the bridge to halt the rise in temperature of $R_2$ until a subsequent "on" signal is generated by opening and closing switch 66.

The gate 10 and overheat detector amplifier 11 operate to protect the operator of the system by activating a circuit breaker 71 to open the contacts 41 upon the occurrence of a sufficiently high output of the bridge. The gate 10 is activated at the same time as the unlatching of the shunting switch circuit 8. The overheat amplifier receives the same input as the detector amplifier 11 and its operation will be more fully explained hereinafter. The limiter 9 operates to prevent the overdrive of the detector circut 7.

the more detailed explanation of the operation of the control system of the invention will now be given with reference to the schematic diagram of FIG. 2 wherein the same numbers used to identify components in FIG. 1 have been employed to designate similar components in FIG. 2.

The primary of the high current generating impulse transformer $T_2$ is powered from a commerical A.C. source via receptacle 90, normally open relay contacts 42, and normally closed circuit breaker contacts 41, the relay contacts 42 being operated by a power relay 43. The secondary of the transformer $T_2$ is connected across the power terminals of a bridge circuit at the nodes 44 and 45 of the bridge. The bridge, as noted above, comprises the resistors $R_2$ $R_{30}$ connected in series with each other across the power terminals of the bridge, and the resistors $R_1$, $R_{29}$, and $R_{50}$ and switch 66 connected in series with each other and in parallel with the series combination of $R_2$ and $R_{30}$. The output of the bridge between the nodes 47 and 48 is sensed by a detector circuit 7, as will be explained in greater detail herein below. The resistor $R_2$, as mentioned above, is of a type which has a high positive temperature coefficient of resistance. The remainder of the control circuits of FIG. 3 have the primary function of controlling the application of power from the transformer $T_2$ to the bridge so that it rises rapidly from a relatively cold temperature to a temperature sufficiently high to properly seal a heat sealable package into which it is brought in contact, and to automatically disconnect power from the bridge upon reaching this temperature. This control is affected by controlling power to the power relay 43 in response to various control signals.

The power relay 43 is powered from a low voltage stepdown transformer $T_1$ which has its primary connected to the conventional power source 55 via the receptacle 90 and the circuit breaker switch contacts 41 which are normally closed when the circuit is in operation. The secondary of the transformer $T_1$ is center tapped at C to provide a common or system reference voltage on lines 55, 57, 58 and 59, the center tapped connection C being coupled by common lines 55 and 59 to the output node 47 of the bridge. The secondary of transformer $T_1$ provides a pulsating full wave d.c. voltage on lines 56 and 60 by means of diodes $D_4$ and $D_5$, and semi-filtered and filtered d.c. voltages at nodes S and F, respectively. The filtered d.c. voltages are generated by applying the full wave network through isolating diode $D_3$ across the filter network comprising resistor $R_{14}$ and capacitor $C_2$. Thus, the secondary of the transformer $T_2$ provides various d.c. voltages between the common line 55 and the lines 54, 60, and 57, and the node S and F.

The line 56 is connected to one side of the coil of power relay 43, the other side of the coil 43 being connected to the common line 58 via the collector-emitter path of $Q_7$, which is part of the isolation amplifier 4, diode $D_{10}$, the collector-emitter path of $Q_6$, which is the output stage of the bistable circuit 5, and line 58. Since the transistors $Q_7$ and $Q_6$ are turned "off" at the beginning of each heating operation, the relay 43 is de-energized and power cannot be applied to the primary of $T_2$ via the contacts 42.

The bistable circuit 5 comprises the transistors $Q_4$, $Q_5$ and $Q_6$ and is powered in part from the semi-filtered voltage at node S which is connected to the collector of $Q_6$ via $R_5$. The bistable network is also powered by the filtered supply on line 54 which is connected via $R_{23}$ to the base of $Q_5$ and the collector of $Q_4$. The filtered voltage on line 54 is also connected to the collector of $Q_5$ via $R_{22}$. The emitters of $Q_4$ and $Q_6$ are returned to common by line 58, and the base of $Q_6$ and the emitter of $Q_5$ are coupled together and returned to common via resistor $R_{27}$. The base of $Q_4$ is returned to common via diode $D_{18}$. The output of the bistable circuit is generated across the collector and emitter terminals of $Q_6$. A feedback resistor $R_{20}$ is connected between the collector of $Q_6$ and the base of $Q_4$ to latch the bistable circuit 5 in either 1 of its two oppositely saturated states. the bases The output of the bistable circuit 5 on the collector of $Q_6$ drives the transistor $Q_7$ in the isolation amplifier 4 between conducting and non-conducting states. The bistable circuit 5 is in its "off" condition before the beginning of each heating operation, having been driven to this state by a pulse on line 62 during the previous heating operation. With the bistable circuit "off", $Q_4$ is turned "on"84 and conducting and thebases of $Q_5$ and $Q_6$ are both pulled to common to render $Q_5$ and $Q_6$ non-conducting or "off".

The bistable circuit 5 is switched "on" by negative pulses on lines 63 and 64. When the bistable circuit 5 is triggered "on", $Q_4$ is rendered non-conductive or "off", and $Q_5$ and $Q_6$ are rendered conductive which pulls the emitter of $Q_7$ to common, thereby drawing saturating base current from the line 56 via $R_9$ to turn $Q_7$ "on". With $Q_7$ conducting the coil of relay 43 draws full wave pulsating power via line 56, the coil of relay 43, the collector-emitter paths through $Q_6$ and $Q_7$, and lines 58 and 55.

The manual trigger pulse generator circuit 6 initiates the heating operation by generating a trigger pulse on line 63 in response to the movement of the switch 66 from the open to the closed position. The pulse is developed by charging the capacitor $C_1$ when the switch 66 is open and dischargng it through the base-emitter path of $Q_4$ upon the subsequent closing of the switch 66. The capacitor $C_1$ charges from d.c. supply line 56 to common through the series combination of resistors $R_{22}$, $R_{21}$, $D_1$, $R_{50}$, $C_1$ and $R_{28}$. When the switch 66 is open, the capacitor $C_1$ charges through this series path with the side of $C_1$ connected to line 63 becoming negative. When the switch 66 is closed, the resistor $R_{30}$, which is selected to be very small relative to the other bridge resistors, is connected between common and the junction of $R_{50}$ and $D_1$ to complete a conductive path across the capacitor $C_1$ through the base-emitter path of $Q_4$, this path comprising $C_1$, $R_{26}$, $D_{15}$, $D_{14}$, the base-emitter path through $Q_4$, lines 58, 59 and $R_{30}$. As a result of this, the base of $Q_4$ is pulled negative with respect to common and $Q_4$ is thereby turned "off". When $Q_4$ is turned "off", the bistable circuit 5 is turned "on" since $Q_5$ and $Q_6$ are driven to their conducting states, as explained hereinbefore.

A conductive path from node 45 of the bridge through diode $D_9$, resistor $R_{19}$ and line 62 triggers the bistable circuit 5 "off" once each positive half cycle of bridge power while the heater $R_2$ is below the preselected temperature.

The detector circuit 7 is a d.c. comparator which comprises a two stage direct coupled amplifier with positive feedback and includes the PNP transistors $Q_1$ and $Q_2$. This type of comparator circuit is specifically described in U.S. Pat. No. 3,264,572, and described hereinafter only briefly. The detector circuit 7 is powered by an unfiltered full wave pulsating d.c. voltage on line 60 which is connected to the emitters of transistors $Q_1$ and $Q_2$. The unfiltered supply on line 60, when coupled to the detector circuit 7, continuously varies the bias voltages on the transistors $Q_1$ and $Q_2$. The biasing resistors for the transistors $Q_1$ and $Q_2$ are perfectly balanced when the supply voltage on line 60 is low, and the gains of the transistors increase as the voltage rises.

The output of the bridge circuit at nodes 47 and 48 is fed into the detector circuit 7 via the collectors of the transistors $Q_1$ and $Q_2$. The collector of $Q_1$ is connected to the node 47 via $R_{17}$ and lines 58, 55 and 59, and the collector of $Q_2$ is connected to the output node 48 via the resistors $R_{24}$ and $R_{25}$. The base of the transistor $Q_1$ is coupled to the collector of transistor $Q_2$ by a feedback resistor $R_8$, and the base of transistor $Q_2$ is coupled to the collector of transistor $Q_1$ via the resistor $R_7$.

The limiter circuit 9 consists of the resistor $R_{25}$ and the oppositely polarized diodes $D_{16}$ and $D_{17}$ which are connected between common and the input to the collector of $Q_2$ and has two functions. It prevents damaging signals from affecting the detector transistors, and it attenuates the signal generated by the comparator itself that would otherwise be fed back into the bridge and possibly turn on the overheat detector amplifier 11 before overheat actually occurs.

An output pulse generating network 15 including resistor $R_{18}$, capacitor $C_3$ and diode $D_{12}$ is connected as shown between the collectors of the transistors $Q_1$ and $Q_2$. Pulse generating circuits of this type for use with various detecting circuits are described in detail in application Ser. No. 879,173, assigned to the same assignee as the present application.

As a result of the selection of the bridge resistors, when the temperature of the heater $R_2$ is below the preselected value, the output of the bridge at the time the detector circuit 7 is activated is negative, i.e., the node 48 is negative with respect to the node 47 or common. If at this time the voltage supply on line 60 is coupled to the emitters of transistors $Q_1$ and $Q_2$, since the collector of $Q_2$ will be more negative then the collector of $Q_1$, $Q_1$ is turned "on" and conducts heavily. With $Q_1$ turned "on" its collector rises to the potential on line 60 and this collector voltage is fed back to the base of $Q_2$ via the feedback resistor $R_7$ thereby tending to latch $Q_2$ in the non-conducting state.

Also, as $Q_1$ is turned "on", $C_3$ charges through the series circuit comprising $D_{17}$, $R_{24}$, $D_{12}$, $C_3$ and $Q_1$ with the side of the capacitor $C_3$ connected to the collector of $Q_1$ becoming more positive. As the pulsating voltage on line 60 falls to zero this positive side of the capacitor is pulled to common, diode $D_{12}$ is back biased, and diodes $D_{13}$ and $D_{14}$, which were previously back biased as $C_3$ was charging, unlatch to couple the negative side of the charged capacitor $C_3$ to the base of $Q_4$, driving $Q_4$ into conduction.

Thus, the detector circuit 7 is activated during a specific portion of the positive half wave of power to the bridge (negative half wave of voltage across $R_{30}$) and is driven by the polarity of the instantaneous output of the bridge to one of two oppositely stable states. When the heater $R_2$ is below the preselected temperature, the detector circuit 7 is driven to a condition such that, at the end of each positive half wave of bridge power near the zero crossover point of bridge power, a negative pulse is coupled from the output pulse generating circuit of the comparator via line 64, $D_{13}$ and $D_{14}$ to the base of $Q_4$ to turn "on" the bistable circuit (by turning "off" $Q_4$).

When the temperature of $R_2$ rises above the preselected temperature, the input to the comparator changes polarity and the comparator is driven to its other stable state whereby no trigger pulse is fed to the base of $Q_4$ and the bistable circuit is allowed to remain "off", having been previously driven to this state by the positive half cycle of bridge power on line 62.

The d.c. detector 7 does not continuously monitor the output of the bridge but rather is programmed by means of a shunting switch circuit 8 to detect the output of the bridge during alternate positive half cycles of the power applied to bridge. The point on the positive half cycle at which the detector circuit 7 is activated by the switch circuit 8 is determined by the voltage drop across the resistor $R_{30}$ in the bridge.

The shunting switch circuit 8 comprises the transistor $Q_3$ which has its collector connected to line 60 and its emitter connected directly to the circuit common via line 58. When the transistor $Q_3$ is conducting or turned "on", it shunts the input line 60 to common thereby preventing the activation of the detector circuits 7 by holding the emitters of transistors $Q_6$ and $Q_7$ at common. When the transistor $Q_3$ is turned "off" or rendered non-conductive the pulsating d.c. voltage on line 60 is alowed to drive the emitters of transistors $Q_1$ and $Q_2$ to activate the detector circuits 7.

The transistor $Q_3$ is normally biased to its conducting or "on" state since its base-emitter junction is forward biased by the small positive d.c. voltage at the bottom of $R_6$, the top of $R_6$ being connected to the semi-filtered d.c. supply at junction S. The base-emitter junction of $Q_3$ is also connected in series with the resistors $R_{30}$ and $R_{16}$ such that the small positive d.c. bias voltage at the bottom of $R_6$ increased or decreased depending upon the polarity and magnitude of the a.c. signal across $R_{30}$ of the bridge. A positive a.c. voltage across $R_{30}$ merely increases the forward bias on the base-emitter junction of $Q_3$ further driving it into saturation and holding it "on". When a negative a.c. voltage of sufficient magnitude is developed across $R_{30}$, however, it opposes the d.c. bias at the bottom of $R_6$ and decreases the forward bias on transistor $Q_3$ sufficiently to render it non-conductive. This permits the previously short circuited line 60 to fed full wave pulsating d.c. power to the emitters of transistors $Q_{10}$ and $Q_2$ thereby activating the detector circuits 7 to sense the bridge output.

A damping network consisting of the resistor $R_{10}$ and the diode $D_7$ is connected as shown across the coil of the relay 43 to suppress transient voltages occurring during de-energization of the coil and resulting from the inductive characteristics of the coil. The diode $D_7$ connected across the coil of the circuit breaker 71 performs a similar function.

The gate 10 and overheat detector amplifier 11 are controlled in a similar manner as the detector circuits 7 so as to be activated once each positive half cycle of bridge power. The base of the transistor $Q_9$ is connected via $R_{13}$ to the full wave pulsating d.c. on line 60. The base of $Q_9$ is held at circuit common as long as the transistor $Q_3$ of the shunting switch circuit 8 is conducting via line 60 and the collector-emitter path through transistor $Q_3$. The collector of $Q_9$ is coupled to the base of $Q_{10}$ and to the emitter of $Q_{10}$ via the resistor $R_{11}$. The emitter of $Q_{10}$ is coupled to one side of the coil of the circuit breaker 71, the other side of the coil being connected to the pulsating full wave d.c. on line 56. The collector of $Q_{10}$ is returned to common via line 57. The emitter of $Q_9$ is fed by the collector of transistor $Q_8$, the emitter of $Q_8$ being returned to circuit common on line 57.

The gate 10 comprises the transistor $Q_9$ and the overheat detector amplifier 11 comprises the transistors $Q_8$ and $Q_{10}$.

The input to the overheat detector amplifier 11 comprises the output of the bridge on nodes 47 and 48. Node 48 is coupled to the base of the transistor $Q_8$ via resistor $R_{15}$ and node 47 is coupled to the emitter of transistor $Q_8$ via the common lines 57, 55 and 59. If, at the time the shunt switching circuit 8 is opened so as to allow positive full wave power to be applied to the base of $Q_9$ from line 60, the output of the bridge is a sufficiently high positive value so as to indicate an overheat condition, $Q_8$ will be turned "on" and the base of $Q_{10}$ will be pulled toward common via the collector emitter path through $Q_8$ and the collector-emitter path through $Q_9$. This will trigger $Q_{10}$ on and energize the coil of the circuit breaker 71 from the line 56 via the emitter-collector path through $Q_{10}$. With $Q_{10}$ conducting the relay 71 is energized and contacts 41 are opened to disable the control circuits During the time when $R_2$ is below the preselected temperature the output of the bridge at nodes 47 and 48 and thus the input to the base-emitter junction of transistor $Q_8$ is negative at the time the power on line 60 is applied to the gate 10 via the base of $Q_9$, thereby holding transistor $Q_8$ in its non-conductive state and holding the circ4it beaker closed.

The overall operation of the control system of the invention will be reviewed in conjunction with the illustrative waveforms of FIG. 3. With the switch 66 and the contacts 41 and 42 in the positions shown in FIG. 2, no power across the bridge, the bistable circuit 5 is "off" ($Q_4$ "on" and $Q_6$ "off"), and the capacitor $C_1$ is charged with the side of the capacitor $C_1$ connected to the resistor $R_{28}$ being negative. When the switch 66 is closed, the capacitor $C_1$ will be connected across the base-emitter junction of the transistor $Q_4$, thereby generating a pulse, FIG. 3a, which drives the base of $Q_4$ momentarily negative and turns "off" transistor $Q_4$.

Figure 3A:
FIGS. 3A–3H is an illustrative diagram of signals at different points in the circuits of the invention.
Figure 3B:
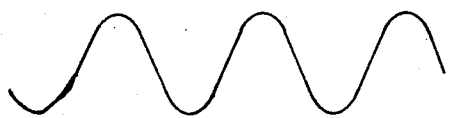
Figure 3C:

When transistor $Q_4$ turns "off" its collector goes positive and drives the base of $Q_5$ positive to thereby turn "on" the transistor $Q_5$. With $Q_5$ conducting the base of $Q_6$ is likewise driven positive to turn "on" the transistor $Q_6$. With $Q_6$ turned "on" the collector thereof is pulled to common and the transistor $Q_4$ is driven further into its non-conducting state by the fedback resistor $R_{20}$. Likewise, with transistor $Q_6$ conducting the emitter of transistor $Q_7$ is pulled to common thereby drawing a saturating base current from the line 56 through the base resistor $R_9$ and the base-emitter path of $Q_7$, thereby rendering $Q_7$ conductive. With $Q_7$ conducting full wave pulsating power on line 56 energizes the relay coil 46 by the series path comprising line 56, relay 43, collector-emitter path of $Q_7$, $D_{10}$, collector-emitter of $Q_6$, lines 58 and 55. With relay 43 energized the contacts 42 close after a small mechanical delay to energize the transformer $T_2$ to apply power to the bridge via the nodes 45 and 44, FIG. 3b. On the first positive half cycle of bridge power on each succeeding positive half cycle a trigger pulse, FIG. 3c, is passed by diode $D_9$ and resistor $R_{19}$ via line 62 to turn "off" the bistable circuit 5 by turning "on" transistor $Q_4$.

Figure 3D:
Figure 3E:
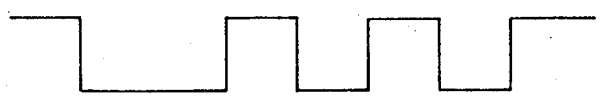
Figure 3F:
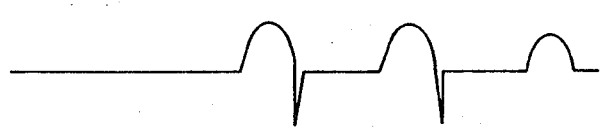
Figure 3G:
Figure 3H:

As soon as power is applied to the bridge an output is continuously present at nodes 47 and 48 of the bridge, FIG. 3h. The output of the bridge cycles between positive and negative polarities successively up to the point at which the temperature of $R_2$ rises above the preselected temperature at which time, the polarities reverse so that two successive positive cycles are present across the nodes 47 and 48, FIG. 3h.

On the first posiive half cycle of bridge power and on each succeeding positive half cycle, the voltage across resistor $R_{30}$, FIG. 3d, reaches a sufficiently negative magnitude to render non-conductive the normally conducting transistor $Q_3$. With transistor $Q_3$ non-conductive, pulsating full wave power is applied via line 60 to the emitters of the transistors $Q_1$ and $Q_2$ thereby energizing the comparator circuit to sense the instantaneous d.c. output of the bridge across the nodes 47 and 48.

When the temperature of the heater $R_2$ is below the preselected value, the potential at 48 will be negative with respect to the potential at node 47, at the time when the detector is activated (negative half cycle of power across $R_{30}$ FIG. 3d). Under these conditions $Q_1$ is turned "on", $Q_2$ is turned "off" and capacitor $C_3$ charges from the pulsating supply on line 60 with its side connected to the resistor $R_{17}$ becoming positive. As the supply voltage on line 60 approaches common, the side of the capacitor $C_3$ connected to the resistor $R_{17}$ is pulled to common and the side of the capacitor $C_3$ connected to diode $D_{13}$ is pulled below common along with the base of transistor $Q_4$, thereby turning "off" the transistor $Q_4$, and turning "on" the bistable circuit 7, which results in the delivery of half wave power to the coil of the relay 43. The above noted sequence continues as long as the temperature of $R_2$ remains below a preselected value. Thus, near the beginning of each positive half cycle of bridge power the bistable circuit is turned "off" ($Q_4$ "on") via line 62 and subsequently back "on" ($Q_4$ "off") via line 64 by a negative pulse from the detector circuits 7.

When the temperature of the heat element $R_2$ rises above the preselected value the input to the detector circuit 7 on the nodes 47 and 48 will change in polarity, FIG. 3h, such that the node 48 is positive with respect to the node 47 at the time the detector is activated by the negative voltage across resistor $R_{30}$. Under these conditions transistor $Q_1$ will be cut "off" and transistor $Q_2$ will saturate, thereby preventing the charging of capacitor $C_3$ and eliminating the negative pulse via line 64 at the end of the positive half cycle of bridge power, FIG. 3f. As a result the bistable circuit will remain "off" ($Q_4$ "on", $Q_5$ and $Q_6$ "off"), thereby blocking the conductive path from line 56 through the coil of relay 43 to common and opening the contacts 42 to de-energize the bridge and halt the rise in temperature of the element $R_2$.

The above noted sequence will be repeated upon successive openings and closing of the switch 66. The waveforms of FIG. 3 are merely shown for illustrative purposes and may not reflect the actual waveforms for a practical circuit.

Figure 2:
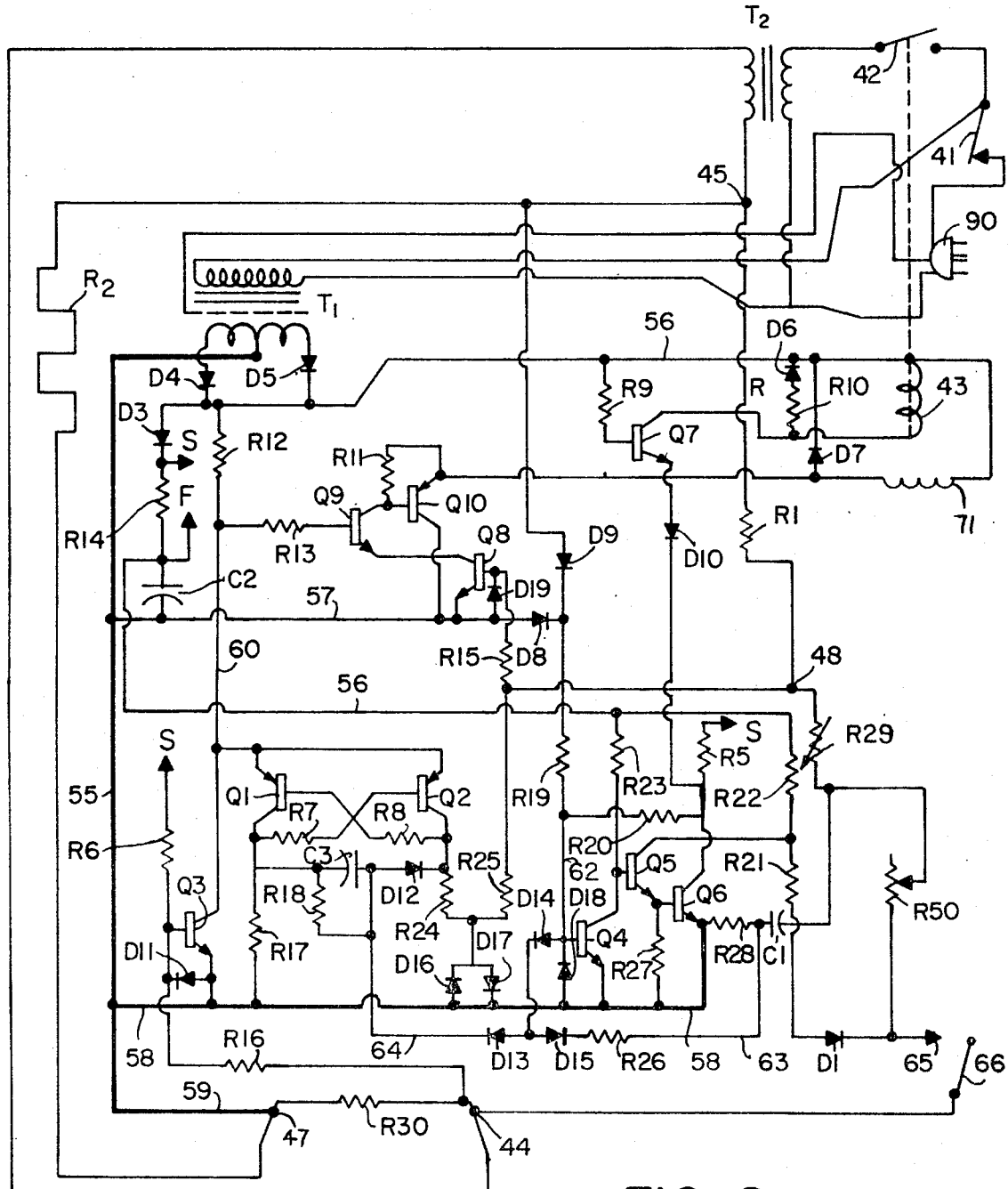
FIG. 2 is a schematic diagram of the control circuits of the invention.

By adding the additional network shown in dotted lines to the manual trigger generator circuit 6 of FIG. 2, the control circuits may provide rapid successive heating operations wherein the heater $R_2$ reaches two different final temperatures dependent upon the settings of the potentiometers $R_{50}$ and $R_{51}$. The components $R_{51}$ and $D_2$ and the newly added contact 102 for the switch 66 operate in a manner similar to the components $R_{50}$, and $D_1$ of FIG. 2. When the movable arm of the switch 66 engages the contact 65, the capacitor $C_1$, as discussed hereinbefore, is discharged to begin a first heating operation and simultaneously the bridge is completed through resistor$R_{50}$ to select a specific balance point for the bridge and thus a specific final temperature for the heater $R_2$.

When the movable arm of switch 66 is moved away from the contact 65 and toward the contact 102, before engagement thereof and during the fly across time, the bridge is again opened and capacitor $C_1$, which was previously discharged, is again charged. As the movable arm of the switch 66 engages contact 102 th capacitor $C_1$ is again discharged and the bridge circuit is again completed by connecting potentiometer $R_{51}$ to ground. Since potentiometer $R_{51}$ may be set to provide a bridge balance point which is different than the balance point provided by $R_{50}$, the heating operation will result in a different final temperature for the heater $R_2$.

Thus, it is seen that when the system of FIG. 2 is modified by adding the network shown in dotted lines in FIG. 2, it has the capability of providing rapid successive heating operations at different temperature settings in response to the movement of the movable arm of switch 66 between contacts 65 and 102, each engagement of the movable arm with either of the contacts simultaneously initiating a heating operation and competing the bridge circuit with a preselected balance point.

While the system of FIGS. 1 and 2 has been explained as being controlled by a manually operated switch 66, it is equally possible that it may be operated by any suitable external command in response to which a negative pulse to initially trigger the bistable circuits 5 to the "on" condition is generated.

In order to afford a more complete illustration of a specific embodiment of the invention a more specific description of the components in the schematic diagrams of FIG. 2 is set forth below. This information is provided only by way of illustration and not as a limitation on the invention.

| | | |
|---|---|---|
| $R_1$ | | 725 ohms |
| $R_2$ | 2ft. of Glasseal 29-17 Techalloy Co., Inc. | |
| $R_{10}$, $R_{14}$, $R_{26}$ | | 150 ohms |
| $R_{50}$, $R_{51}$ | potentiometer | 100 ohms |
| $R_{30}$ | | 0.1 ohm |
| $R_{16}$ | | 510 ohms |
| $R_{29}$ | potentiometer | 125 ohms |
| $R_{15}$, $R_{25}$ | | 300 ohms |
| $R_5$, $R_6$, $R_7$, $R_8$, $R_{13}$ | | 10 kilohms |
| $R_{11}$, $R_{12}$, $R_{27}$ | | 3.3 kilohms |
| $R_9$, $R_{21}$, $R_{22}$, $R_{28}$ | | 2.2 kilohms |
| $R_{23}$ | | 56 kilohms |
| $R_{19}$ | | 360 kilohms |
| $R_{17}$, $R_{24}$ | | 4.7 kilohms |
| $R_{18}$ | | 27 kilohms |
| $R_{20}$ | | 100 kilohms |
| $T_1$ — secondary rating, 56V with center tap at 5VA | | |
| $T_2$ — secondary rating, 36V at 30-50 Amp. | | |
| $Q_1$, $Q_2$ | matched | 2N3638 |
| $Q_3$, $Q_9$, $Q_6$, $Q_7$ | | 2N3568 |
| $Q_{10}$ | | 2N4355 |
| $Q_8$, $Q_5$, $Q_4$ | | 2N2222 |
| $C_1$ | | 0.01 microfarad |
| $C_2$ | | 50 microfarad |
| $C_3$ | | 0.068 microfarad |

The switch contacts 42 of the circuit of FIGS. 1 and 2, since they may open or close at a time when a high potential difference is present thereacross from the source 95 may be subject to deterioration due to the effects of arcing. In order to reduce this contact wear the arc suppression circuit 111 of FIG. 4 may be connected as shown in conjunction with the circuits of FIGS. 1 and 2. The load 110 has been illustrated generally but it could be, for example, the primary of transformer $T_2$, as would be the case in FIGS. 1 and 2. The same a.c. source 95 utilized to energize the circuit of FIG. 1 is shown connected to the arc suppression circuit 111 of FIG. 4.

The arc suppression circuit 111 comprises a said state gate controlled a.c. switch or triac 100 having its power terminal 104 connected to the stationary contact 42a via the inductor $L_1$ and having its power terminal 103 connected to the movable switch contact 42b via the movable arm of the switch. While a power relay has been disclosed as operating the contacts 42 in the circuits of FIGS. 1 and 2, it should be understood that a variety of other means are available to open and close the contacts 42 such as breakers, temperature sensitive elements, etc. The a.c. source 95 is connected in series with the load 110, the contacts 42 and the inductor $L_1$, and in series with the power terminals of the triac 100 and the load 110. A capacitor $C_{30}$ and a resistor $R_{60}$ are connected in series across the power terminals of the triac 100. The control terminal 101 of the triac 100 is connected via the resistors $R_{62}$ and $R_{61}$ to one side of the inductor $L_1$. A capacitor $C_{31}$ is connected between the junction of the resistors $R_{61}$ and $R_{62}$ and the side of the inductor $L_1$ connected to the stationary contact 42a.

As is understood by those skilled in the art, the triac 100 operates such that when a suitable biasing signal of either polarity is applied between the control terminal and the power terminal, the switch will be triggered into a conducting state in which alternating current will flow between its terminals 103 and 104 so long as there is also provided a voltage of either polarity greater than a certain threshold value across its power terminals.

The arc suppression circuit operates on the principle that if an arc, such as the arc formed between two switch contacts during the opening thereof, is located within a resonant circuit loop, there will appear in the resonant loop an oscillation at the resonant frequency of the loop. The strength and duration of the oscillations will depend on the magnitude of the arc. In a sense, the arc acts as an energy source to shock the resonant circuit into oscillation. Part of this oscillation is tapped to trigger a semiconductor device to substantially short circuit the switch contacts and reduce the voltage thereacross to zero thereby suppressing the arc.

In the arc suppression circuit 111 of the invention, the capacitor $C_{30}$ and the inductor $L_1$ form a resonant circuit which is connected in series with the switch contacts 42. When the contacts 42 are opened, or bounce open during a closure of the contacts, an arc is formed. This arc initiates an oscillation in series combination comprising $L_1$, $C_{30}$, $R_{60}$, and the open contacts 42 across which the arc is present. The voltage generated across $L_1$ by this oscillation triggers the triac 100 via the control electrode 101 and one of the power terminals of the triac 100.

The frequency to which the combination of capacitor $C_{30}$ and inductor $L_1$ is turned can vary within certain limits. An upper limit for this resonant frequency is the duration of the pulse required to trigger the triac 100. Preferably, the oscillation should be low enough so that a half wave thereof is two to four times longer than the necessary gate triggering time of the triac 100.

The lower limit is chosen such that the oscillation is very rapid compared to the frequency of the power supply being interrupted by the contacts 42. If the tuned frequency is chosen to be too low, the delay between the beginning of the arc and the time at which the tric is made conductive will be too long to prevent serious damage to the surface of the contacts 42. Preferably, the life of any arc should be limited to a small fraction of the duration of a half cycle of line or power supply frequency.

The resistor $R_{60}$ in the arc suppression circuit is simply for limiting discharge currents through the triac or contacts that might occur with a closure of contacts 42 near peak line voltage. The resistor $R_{62}$ in series with the control eletrode of the triac 100 limits current, and in combination with capacitor $C_{31}$ helps stretch the trigger pulse to the control electrode.

Since the coil $L_1$ is in series with the supply 95, a sufficiently large voltage may be developed across it to continually trigger the triac 100. The resistor 61 and capacitor 31 prevent this possibility by attenuating the voltage being fed into the control electrode at the frequency of the supply. It should be noted that if a coil $L_1$ with a very small resistance is employed, such as with a ferrite core, it may be possible to eliminate the attenuating network comprising $R_{61}$ and $C_{31}$. It should be understood that the arc suppression circuit 111 of FIG. 4 may be employed to reduce wear in conjunction with any switch contacts and is not necessarily limited for use with the circuit of FIGS. 1 and 2.

Figure 4:
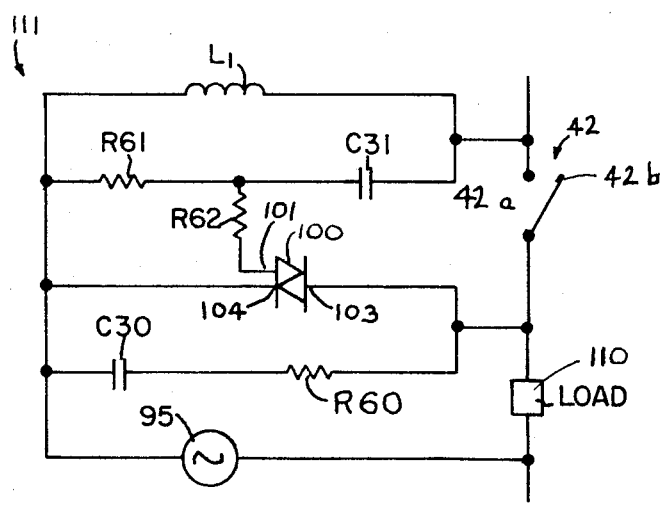
FIG. 4 is an additional embodiment of the invention for reducing wear in the power relay contacts due to high current arcing. 7

The following list of components for the arc suppression circuit of FIG. 4 was found to operate satisfactorily with a 120 volt supply at 60 $H_3$ at normal loads of about 20 amperes.

$L_1$ = 25 turns of No. 16 wire on 2¼ in. × 2¼ in. form resistance of 80 milliohms $R_{61}$—220 ohms
$R_{60}$—10 ohms
$C_{31}$—1 microfarad, 200 volt
$C_{30}$—.25 microfarad, 400 volt
triac 100—Q 2040 — T03
$R_{62}$—4.7 ohms Having described this invention, what I claim is:

1. A system for controlling temperature comprising a source of pulsating electrical current,
    a heater element having a high temperature coefficient of resistance,
    an electrical bridge with said heater element connected as one arm thereof, said bridge being unbalanced with a first polarity output when said heater element is below a preselected temperature and unbalanced with a second polarity output when said heater element is above said preselected temperature,
    circuit means for coupling said source to said bridge in response to an external command to begin the heating of said heater element, decoupling said source from said bridge in response to the change in the polarity of the output of said bridge during preselected time intervals, and inhibiting the recoupling of said source to said bridge until the subsequent occurrence of said external command.

2. The system recited in claim 1 wherein said circuit means comprises,
    a power relay including switching contacts in series with said source and said bridge, and a power relay coil,
    power relay energizing means for operating said power relay, including
    an electronic switch,
    first control circuit means for operating said electronic switch in response to said external command to permit energization of said power relay and the connection of power from said source to said bridge to begin the heating of said heater element, and
    second control circuit means for operating said electronic switch to de-energize said relay when said heater element reaches said preselected temperature.

3. The combination recited in claim 2 wherein said second control circuit means includes pulse generating means for alternately opening and reclosing said switch when said heater element is below said preselected temperature the time period during which said switch is open being insufficient to de-energize said relay and for opening said switch for a time period sufficient to de-energize said relay when said heater element rises above said preselected temperature.

4. The combination recited in claim 3 wherein said pulse generating means comprises turn off signal generating means for opening said switch at a preselected time during each cycle of power applied from said source to said bridge, and turn on means for generating a first signal for reclosing said switch subsequent to each of its openings by said turn off means after a sufficiently short time to maintain said power relay energized when said heater element is below said preselected temperature and for generating a second signal for permitting said switch to remain open subsequent to its opening by said turn off means when said heater element rises above said preselected temperature to permit the de-energization of said power relay and the disconnection of said source from said bridge.

5. The combination recited in claim 4 wherein said turn on means comprises a d.c. comparator for intermittently sensing the instantaneous output of said bridge and generating said first signal when its output is of a polarity to indicate that the temperature of the heater element is below said preselected temperature and for generating said second signal when the polarity of said output indicates that the temperature of the heater element is above the preselected temperature.

6. The combination recited in claim 5 further including means for activating said comparator and during alternate half cycles of current to said bridge.

7. The combination recited in claim 2 wherein said electronic switch comprises a bistable circuit, one stage of said bistable circuit being in series with said power relay coil, said one stage presenting a high impedance to the flow of current through said relay coil when in a first state and presenting a low impedance to the flow of current through said relay coil when in a second state.

8. The combination recited in claim 7 wherein said first control circuit means further includes a second switch connected in one arm of said bridge, and initiating means responsive to the closing of said switch for generating a pulse to switch said one stage of said bistable circuit from its first state to its second state.

9. The combination recited in claim 8 further including,
a capacitor coupled to said bistable circuit nnd said switch,
means for charging said capacitor when said switch is open, and
means, including said switch, for discharging said capacitor when said second switch is closed to trigger said one stage of said bistable circuit from its first state to its second state.

10. The combination recited in claim 5 wherein said comparator comprises
a two stage semiconductor amplifier with positive feedback having two oppositely saturated states, said comparator having its input coupled to the output of said bridge and an output coupled to said switch, said comparator being driven to one of its oppositely saturated states by said first polarity output of said bridge to generate said first signal and to the other of its saturated states by said second polarity output of said bridge.

11. The combination recited in claim 6 wherein said means for activating said comparator comprises
a gate circuit for maintaining said comparator deactivated when in a first state and for activating said comparator when in a second state, and
means for controlling said gate circuit in response to the voltage across an arm of said bridge to switch said gate circuit from said first state to said second state when the voltage across said arm reaches a predetermined value greater than zero.

12. The combination recited in claim 11 wherein said gate circuit means includes
a transistor device, said transistor device being conductive in said first state and non-conductive in said second state, said transistor device including a control terminal for conrolling the state of said transistor device in accordance with the voltage applied thereto,
first biasing means for holding said control terminal at a potential to cause said transistor device to assume said first state, and
second biasing means including a resistor connected in one of the arms of said bridge and coupled to said control terminal for applying a potential to said control terminal to switch said transistor device to said second state at a preselected magnitude and polarity of voltage across said resistor thereby activating said comparator.

13. A system for controlling successive heating operations comprising, control circuit means responsive to a trigger signal for initiating the application of power from a source to a heater element in response to an external command, sensing circuit means for monitoring the rise in temperature of said heater element, and automatically disconnecting power from said heater element when it reaches a preselected final temperature, and
means for simultaneously generating a trigger signal for operating said control means to initiate said heating cycle and selecting one of a plurality of final temperatures for said heater element.

14. The system recited in claim 13 wherein said means comprises,
an electrical bridge with said heater element connected as one arm theroef, said heater element having a high temperature coefficient of resistance, another arm of said bridge comprising at least two parallel paths, said paths including resistance means for selecting a plurality of final temperatures for said heater element, and
switch means for alternately connecting one of said paths in circuit with said bridge.

15. The combination recited in claim 14 wherein said switch means has three alternate positions, first and second positions for connecting said paths in circuit with said bridge, and a third position in which neither of said paths is in circuit with said bridge.

16. The combination recited in claim 15 further including heating cycle initiating circuit means response to the movement of said switch means to said first or second positions to generate a signal for initiating the application of power to said heater element.

17. The combination recited in claim 16 wherein said initiating circuit means comprises
a capacitor coupled to said switch means and
capacitor control means for charging said capacitor when said switch means is in said third position and discharging said capacitor when said switch means is moved to said first and second positions.

18. In a system comprising a heater element having a high temperature coefficient of resistance, an electrical bridge having said heater element in one arm thereof, and control circuit means for generating a signal for controlling the application of power from a source of alternating current to said bridge in accordance with the temperature of said heater element, said bridge means being unbalanced with a first polarity output when said heater element is below a preselected temperature and unbalanced with a second polarity output when said heater element is above said preselected temperature, the improvement comprising,
first circuit means forming a portion of said control circuit means for sensing a change in the polarity of the output of said bridge and generating a control signal in response thereto,
second circuit means responsive to said control signal for disconnecting power to said bridge, and timing circuit means for intermittently activating said circuit means on alternate half cycles of power to said bridge from said source.

19. The combination recited in claim 18 wherein said circuit means comprises a detector circuit having two stable states, means for coupling said detector circuit to the output of said bridge, said detector circuit being driven to a first of said stable states in response to said first polarity and to a second of said stable states in response to said second polarity.

20. The combination recited in claim 18 wherein said timing means comprises control means for activating or de-activating said circuit means in response to a bias voltage applied thereto, and means coupled into an arm of said bridge for applying a voltage to said control means to activate said circuit means on alternate half cycles of power to said bridge upon the occurrence of a voltage of preselected magnitude and polarity of said bridge.

* * * * *